(12) United States Patent
DiDonato

(10) Patent No.: US 7,207,296 B2
(45) Date of Patent: Apr. 24, 2007

(54) NO-TANGLE TWO DOG RETRACTABLE LEASH WITH FLASHLIGHT

(76) Inventor: Pietro DiDonato, 212 Bement Ave., Staten Island, NY (US) 10310

( * ) Notice: Subject to any disclaimer, the term of this patent is extended or adjusted under 35 U.S.C. 154(b) by 0 days.

(21) Appl. No.: 11/374,886

(22) Filed: Mar. 14, 2006

(65) Prior Publication Data

US 2006/0201449 A1   Sep. 14, 2006

Related U.S. Application Data

(63) Continuation-in-part of application No. 10/906,971, filed on Mar. 14, 2005, now abandoned.

(51) Int. Cl.
*A01K 27/00* (2006.01)
*B65H 75/34* (2006.01)

(52) U.S. Cl. .................... 119/796; 119/794

(58) Field of Classification Search ........ 119/794–796; 242/381, 381.3, 381.1, 385.4
See application file for complete search history.

(56) References Cited

U.S. PATENT DOCUMENTS

| | | | | |
|---|---|---|---|---|
| 2,106,053 | A | * | 1/1938 | Laingor .................. 33/767 |
| 2,222,409 | A | * | 11/1940 | Gottieb .................. 242/377 |
| 3,853,283 | A | * | 12/1974 | Croce et al. ............ 242/381.6 |
| 4,428,542 | A |   | 1/1984 | Kobayashi et al. |
| 4,501,230 | A | * | 2/1985 | Talo ...................... 119/796 |
| 5,377,626 | A |   | 1/1995 | Kilsby et al. |
| 5,489,010 | A | * | 2/1996 | Rogers ................. 191/12.2 R |
| 5,709,350 | A |   | 1/1998 | Davis et al. |
| 5,762,029 | A |   | 6/1998 | DuBois et al. |
| 5,887,550 | A |   | 3/1999 | Levine et al. |
| 5,906,329 | A |   | 5/1999 | Wesley, Sr. |
| 6,003,472 | A |   | 12/1999 | Matt et al. |
| 6,024,054 | A |   | 2/2000 | Matt et al. |
| 6,148,773 | A |   | 11/2000 | Bogdahn |
| 6,474,270 | B1 |   | 11/2002 | Imes |
| 6,792,893 | B1 | * | 9/2004 | Quintero et al. ............ 119/796 |
| 6,955,138 | B2 |   | 10/2005 | DeBien |

* cited by examiner

*Primary Examiner*—Teri Luu
*Assistant Examiner*—Joshua Michener
(74) *Attorney, Agent, or Firm*—Ostrolenk, Faber, Gerb & Soffen, LLP

(57) ABSTRACT

A two-pet no-tangle retractable leash device including an axle having a rod opening perpendicular to its axis and a first spool including a first leash and a second spool including a second leash rotatably mounted on the axle. Each leash having a proximal end attached to the spool and a distal end extending through one of two leash openings. Additionally, each spool has a spool brake and a return spring, where a proximal end of the return spring is connected to the spool and a distal end of the return spring is connected to the axle. When a force is applied to pull on the leashes, the spools rotate thereby unwinding the return springs. When the force is removed, the return springs rewind forcing the spool to rewind the leash to its original position. The device further includes a shaft having a proximal and a distal ends, the shaft being positioned perpendicular to the axle; a brake rod having a distal end passing through the rod opening and the proximal end passing through the shaft; a cone disk brake connected to the distal end of the brake rod; and a brake spring positioned on the brake rod between the disk cone brake and the axle, wherein the shaft rotation around the shaft axis and the spools' rotation around the axle axis is enabled when the brake is not engaged and disabled when the brake is engaged.

16 Claims, 5 Drawing Sheets

NO-TANGLE TWO DOG RETRACTABLE LEASH WITH FLASHLIGHT

CROSS-REFERENCE TO RELATED APPLICATION

This application is a continuation-in-part of U.S. Nonprovisional application Ser. No. 10/906,971, filed Mar. 14, 2005 now abandoned in the name of Pietro DiDonato and entitled "NO-TANGLE TWO DOG RETRACTABLE LEASH WITH FLASHLIGHT," the entire disclosure of which is incorporated herein by reference.

BACKGROUND OF THE INVENTION

1. Field of the Invention

The present invention relates to a pet leash and more particularly to a no-tangle retractable leash used in connection with simultaneously walking of two pets.

2. Description of the Prior Art

Retractable pet leashes are known in the prior art. For example, U.S. Pat. Nos. 5,762,029, 5,887,550, 6,003,472, 6,024,054 all show a retractable pet leash. However, owners of multiple pets, such as dogs, require the use of multiple retractable leashes, which is very inconvenient.

To solve that problem, multiple pets can be walked while using one handle retractable leash, according to U.S. Pat. No. 6,792,893. Additionally, a single handle retractable leash for multiple pets is described in U.S. Pat. No. 6,474,270.

However, such multiple-pet retractable-leash devices are plagued with problematic leash entanglement. Two pets allowed to run, while tethered to leashes, will most certainly entangle creating a handling problem for the person using the device.

Leash-entanglement prevention devices for non-retractable leashes are known. They are represented in U.S. Pat. Nos. 6,273,029 and 6,626,132. Such devices, when used with retractable leashes, however, do not resolve the entanglement problem of the two-pet retractable-leash devices.

Thus, there is a need for a device that combines the use of two retractable leashes in a one-hand-held device where the leashes automatically disentangle.

SUMMARY OF THE INVENTION

The present invention relates to a no-tangle two dog retractable leash, which is used to walk two dogs simultaneously. A handle is attached to a casing, which encloses a bearing wheel. This bearing wheel of the invention allows the mechanism to spin while the handle connected to a shaft supported by the bearing to stay fixed, e.g., in a person's hand or otherwise in a fixed position, as dogs cross one another's paths while walking. This spinning of the mechanism prevents the two attached retractable leashes from tangling. The retractable leashes provide unmatched flexibility when walking dogs. A flashlight or other devices attached to the casing can provide the pet walker nighttime aid while walking and cleaning up after the pets.

The present invention discloses a two-pet no-tangle retractable leash device that includes an axle having a rod opening, positioned perpendicular to its axis and two spools with leashes rotatably mounted on the axle. A proximal end of the leashes is attached to its respective spool and a distal end extending through one of two leash openings in a housing. Additionally, each spool has a spool brake and a return spring. A proximal end of each return spring is connected to the spool and a distal end is connected to the axle. When a force is applied, e.g., pulling on the leashes, the spools rotate, thereby unwinding the return springs. When the force is removed, the return springs rewind forcing the spool to rewind the leashes to their original position.

The device further includes a shaft and a brake rod, both having proximal and distal ends. The shaft is positioned perpendicular to the axle. A proximal end of a brake rod passes through the shaft and its distal end passes through the rod opening in the axle. A cone disk brake is connected to the distal end of the brake rod and a brake spring is positioned on the brake rod between the disk cone brake and the axle. The shaft rotation around the shaft axis is enabled when the brake is not engaged and disabled when the brake is engaged. Furthermore, the spools' rotation around the axle axis is enabled when the brake is not engaged and disabled when the brake is engaged.

The inventive device is enclosed in a housing used for supporting the axle and the shaft. A front panel of the housing may include an accessory, it also includes a first and second leash opening, each leash opening having an optional grommet. A handle including a stop notch for operating the brake rod is attached to the proximal end of the shaft. It is because the handle is attached to the shaft, which is rotatably supported by a bearing attached to the housing that allows the housing to rotate, thereby untangling the leashes. Similarly, it is the shape of the disc shaped cone brake that rotates together with the brake rod, the shaft and the handle, but when engaged, engages and stops the spools and thereby the leashes from spooling out or retracting.

The handle can take any shape. In one embodiment of the device, the shaft may function as the handle.

Other features and advantages of the present invention will become apparent from the following description of the invention that refers to the accompanying drawings.

DETAILED DESCRIPTION OF AN EMBODIMENT OF THE INVENTION

Figure 1:
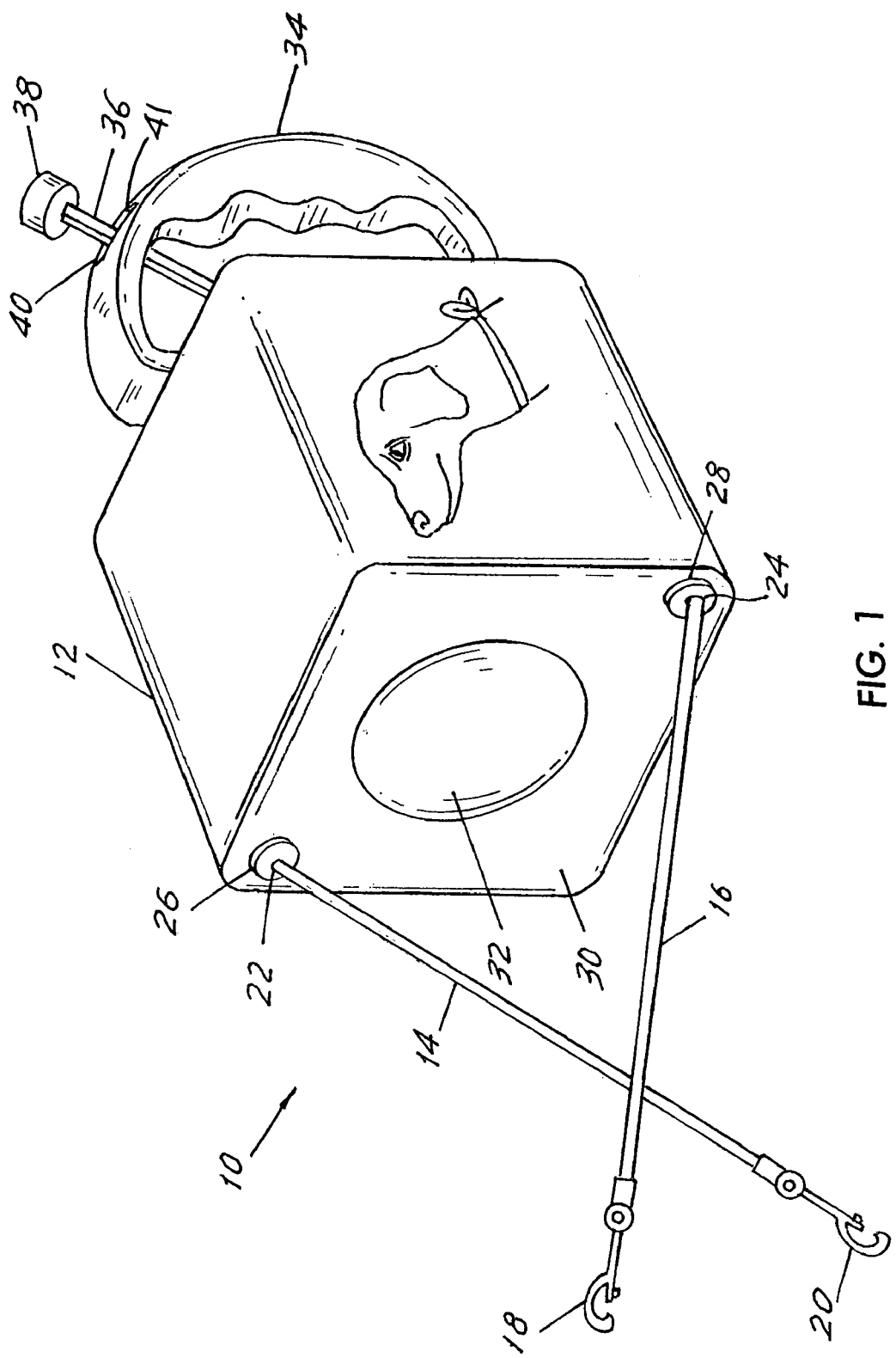
FIG. 1 is a perspective view of the two-pet no-tangle retractable leash of an embodiment of the present invention.

FIG. 1 shows a perspective view of the no-tangle two pet retractable leash device 10. A housing 12 of the device 10 having a front panel 30 that includes a first leash entry opening 22 and a second leash entry opening 24. The leash openings 22 and 24 optionally include a first opening grommet and a second opening grommet 26 and 28. A distal end of a first leash 14 extends through the opening 22 and a distal end of a second leash 16 extends through the second opening 24. Optionally, the leashes may include collar hooks 18 and 20 used to tether the leashes 14, 16 to pet collars.

The front panel 30 may further optionally include an accessory 32. This accessory 32 may be a flashlight, a radio, a global positioning device, a device that measures spooling and retraction of the leashes 14 and 16. The spooling and retraction of the leashes may be measured in order to determine the speed of the leashed pet. The housing further includes a handle 34 that has a brake rod 36 protruding through a rod stop opening 41 that includes a stop notch 40. The brake rod 36 further includes a brake extension opening 86 through which a brake rod extension 36a passes. A brake rod extension 36a may optionally include a push pad 38.

Figure 2:
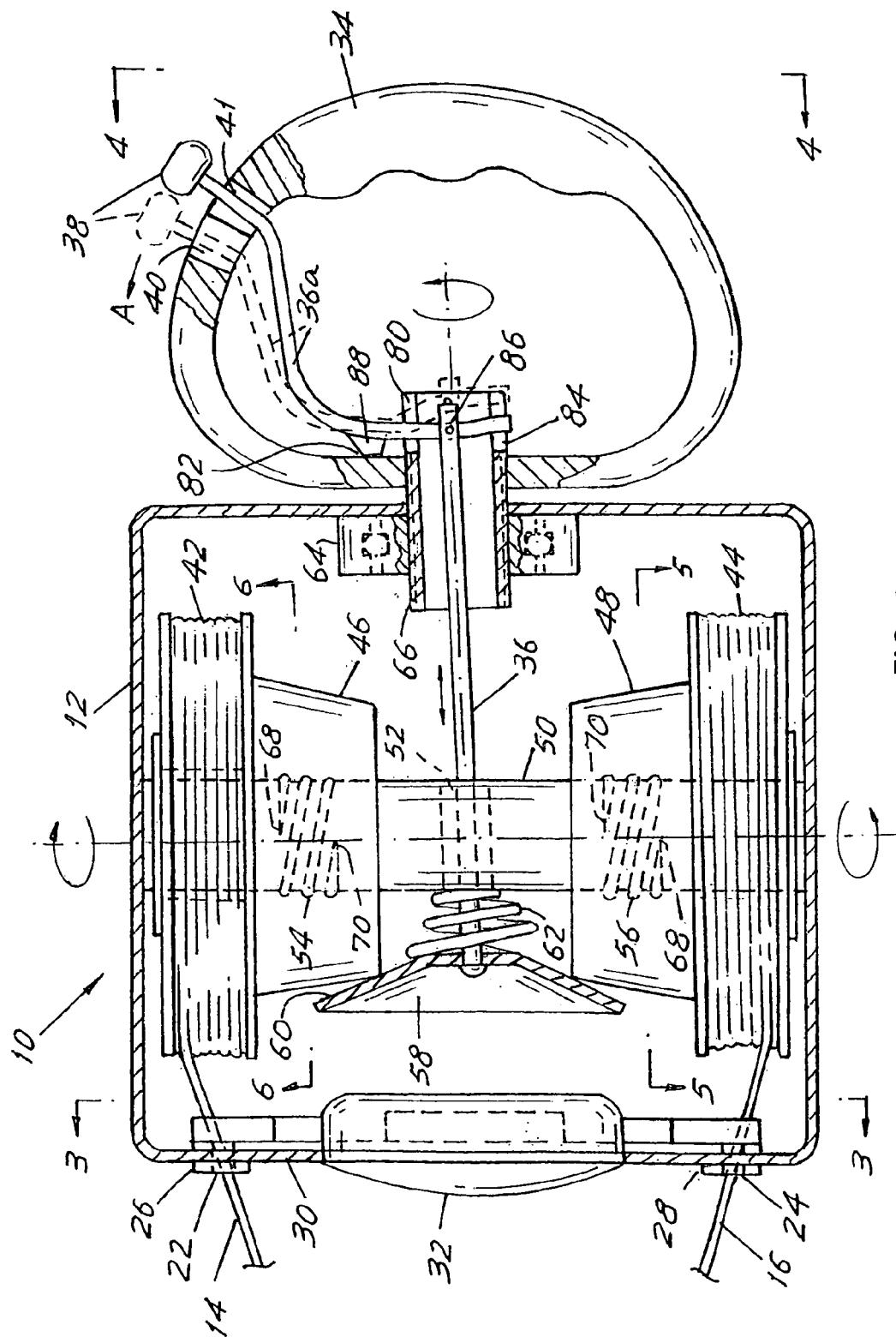
FIG. 2 is a top view of the inside of the housing of the embodiment of FIG. 1.

FIG. 2 shows the no-tangle two pet retractable leash device 10. The leash device 10 includes the housing 12, a first leash spool 42 and a second leash spool 44. The first and second leash spools 42, 44 include first and second spool brakes 46 and 48. The leash spools 42, 44 further include first and second spool return springs 54 and 56.

The housing 12 further includes an axle 50 attached to the housing, which passes through the center of each of the spools 42 and 44. The axle 50 includes a brake rod opening 52.

The first and second spool return springs 54 and 56 include a first return spring end 68 and a second return spring end 70. The second return spring end 70 is fastened to the axle 50 and the first return spring end 68 is fastened to the first or the second spool 42, 44. Leashes 14 and 16 are wrapped around the first leash spool and the second leash spool 42, 44, respectively. The leashes having a proximal end connected to the spool and a distal end protruding through the leash entry openings 22, 24. Each of the leash entry openings 22, 24 may include the opening grommet 26, 28. A housing accessory 32, discussed above with reference to FIG. 1, is fastened to the front panel 30 of the housing 12 of the device 10.

FIG. 2 further shows a disk cone brake 58 having a pad 60 connected to a rod 36. A bearing 64 is shown connected to the housing 12. A shaft 66 is rotatably supported by the bearing 64. The rod 36 passes through the shaft 66 and the brake rod opening 52 and is attached to the cone brake 58. A brake spring 62 is positioned on a section of the rod 36 residing between the cone brake 58 and the axle 50. A height of the brake spring 62 is sufficient to keep the cone brake 58 in a position of just a fraction of an inch away from the spool brakes 46 and 48.

In one embodiment, when the push pad 38 is pushed or moved in the direction A parallel to that of the shaft axis, toward the housing, the brake rod extension 36a enters the stop notch 40 of the handle opening 41. As the top portion of the rod extension 36a having the push pad 38 is move forward, its bottom part connected to a brake notch 84 in the shaft 66 pushes against a pivot point 82 at the bottom of a cutout 86 in the shaft 66. This pushing of the rod extension 36a at the pivot point 82 forces the brake rod 36 to move out of the housing 12 thereby forcing the brake cone 58 connected to the brake rod 36 to depress the brake spring 62 and to engage the spool brakes 46, 48 and through them the spools 42, 44.

When the brake rod extension 36a is not engaged, i.e., it is not held in the rod stop notch 40, the leash spools 42, 44 rotate around the axis of the axle 50 allowing the leash 14, 16 to be spooled out and retracted into the housing 12. Similarly, the shaft 66 and the handle 34 attached to shaft 66 are allowed to rotate around the shaft's axis. The brake rod 36 is held by the rod extension 36a, which extends through the brake extension opening 86 in the rod 36 and rests in a shaft cutout 80. Because the rod extension 36a is attached to the handle 34 through the opening 41, the brake rod 36 and the cone brake 58 attached to it are also rotating around the shaft's axis. The spring 62 allows this rotation by separating the cone disk brake 58 from the spool brakes 46, 48.

When the brake is engaged, by moving of the brake rod extension 36a in the A direction into the stop notch position 40, the brake pad 60 of the cone brake 58 engages with spool brakes 46, 48, thereby preventing spools 42 and 44 from rotating. This stops the movement of the leashes 14, 16. Likewise, the created tension in the cone brake 58, which is attached to the brake rod 36, immobilizes the brake rod 36. The tension in the brake rod 36 is extended to the rod extension 36a, which extends through the brake extension opening 86 in the rod 36 and rests in the shaft cutout 80. Thus, the rod extension 36a wedged in the shaft cutout 80 prevents the shaft 66 from rotating. Additionally, the handle 34 attached to the shaft 66 is also prevented from rotating within the bearing 64. When the brake is engaged all movement around the axle and the shaft axis stops.

Figure 4:
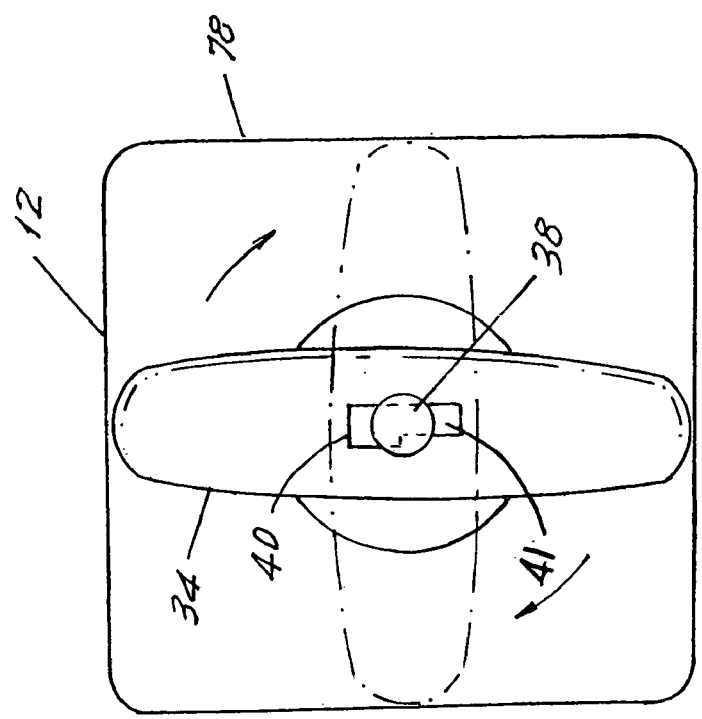
FIGS. 3 and 4 are perspective views of the inside of the front panel and of the outside of the back panel of the housing of the embodiment of FIG. 1.
Figure 3:
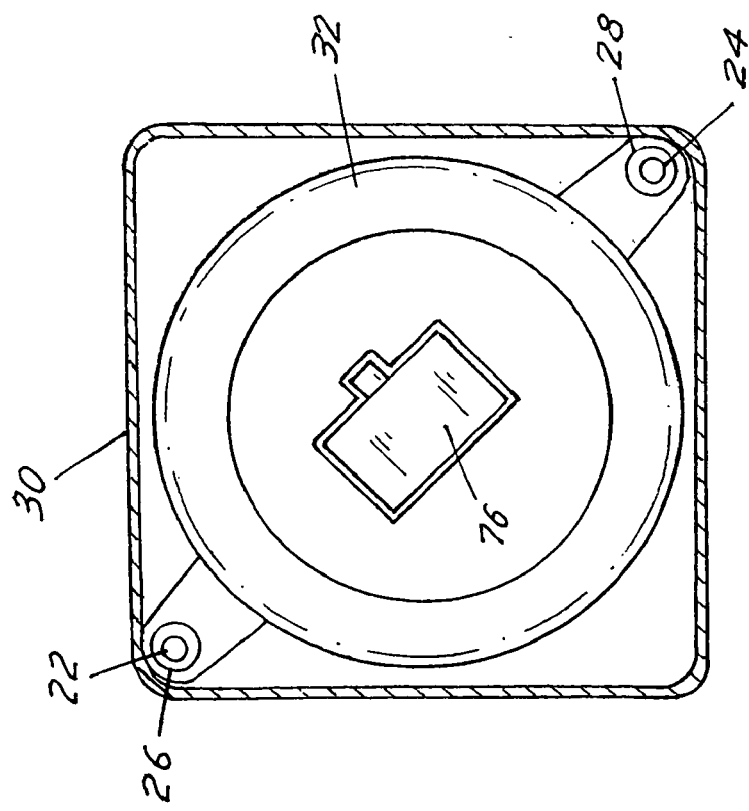

FIGS. 3 and 4 show opposite sides of the housing 12 along the lines 3 and 4 (FIG. 2). In particular, FIG. 3 shows the front panel 30 that includes openings 22 and 24 and optional grommets 26 and 28, the accessory 32 and a battery case 76. FIG. 4 shows a back panel 78 that is positioned parallel and opposite to the front panel 30 of the housing 12. The back panel 78 includes the bearing 64 for supporting the shaft 66 (not shown) to which the handle 34 having the opening 41 and the stop notch 40 is attached. The brake rod extension 36a (not shown) including the push pad 38 protrudes through the shaft and through the opening 41 in the handle 34 having a stop notch 40.

Figure 6:
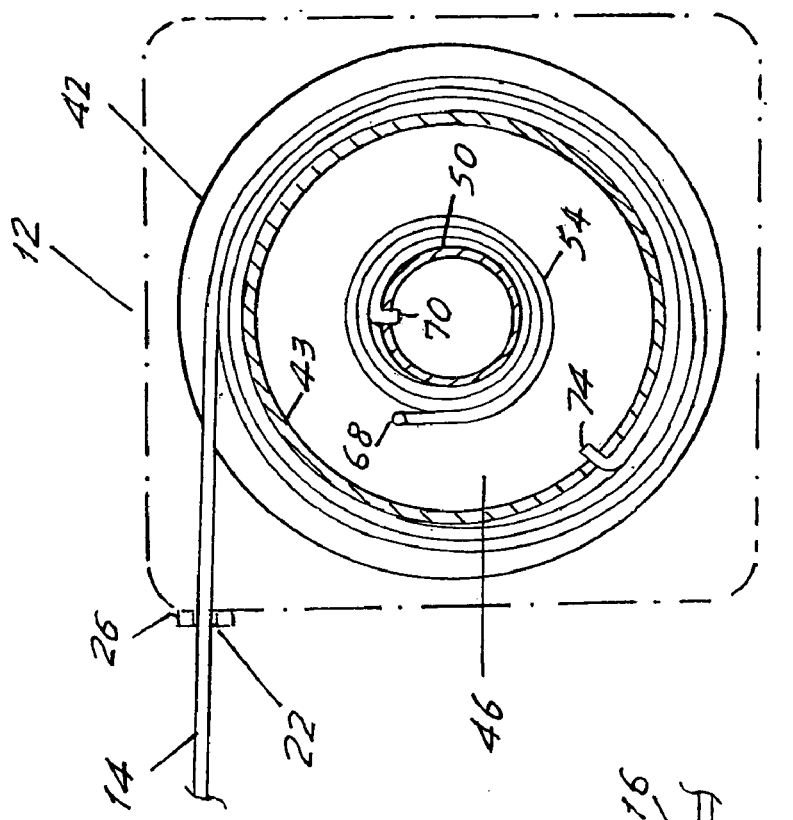
FIGS. 5 and 6 are perspective views of the sides of the housing of the preferred embodiment of the two-pet no-tangle retractable leash of the present invention.
Figure 5:
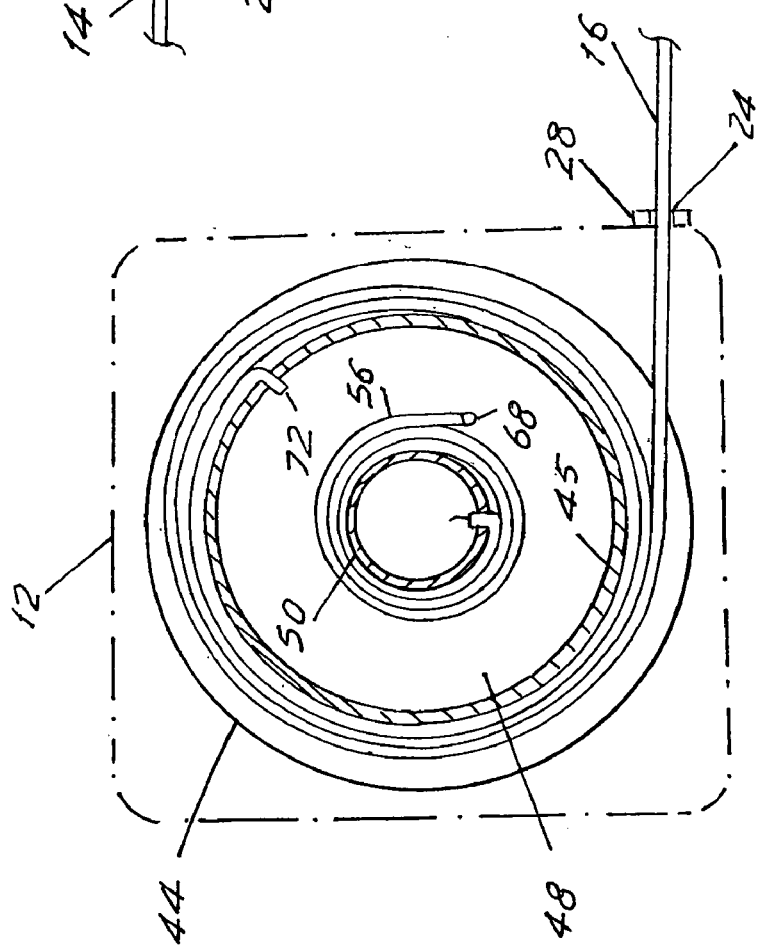

FIGS. 5 and 6 show a side view of the spools 42 and 44 along the lines 5 and 6 (FIG. 2). FIG. 5 shows the housing 12 that includes the spool 44 holding the leash 16. The leash 16 protruding out of the opening 24. The opening 24 may include a grommet 28. The leash 16 being positioned within the spool 44 on top of the spool floor 45. An axle 50 is positioned through the center of the spool 44. The second spool return spring 56 is wound around the axle 50. The first return spring end 68 of the spring 56 is attached to the spool 44. The second return spring end 70 is attached to the axle 50.

FIG. 6 shows a housing 12 including a spool 42 having a floor 43 upon which the leash 14 is wrapped. The leash 14 protrudes out of the housing 12 through the opening 22. The opening 22 may have an optional grommet 26. The spring 54 is wound around the axle 50. The first return spring end 68 is attached to the spool 42 and the second return end 70 of the spring 54 is attached to the axle 50.

Both FIGS. 5 and 6 show the proximal end 74 and 72 of the leashes 14 and 16 being attached to the spool floor 43 and 45 of their respective leash spools 42 and 44.

Figure 8:
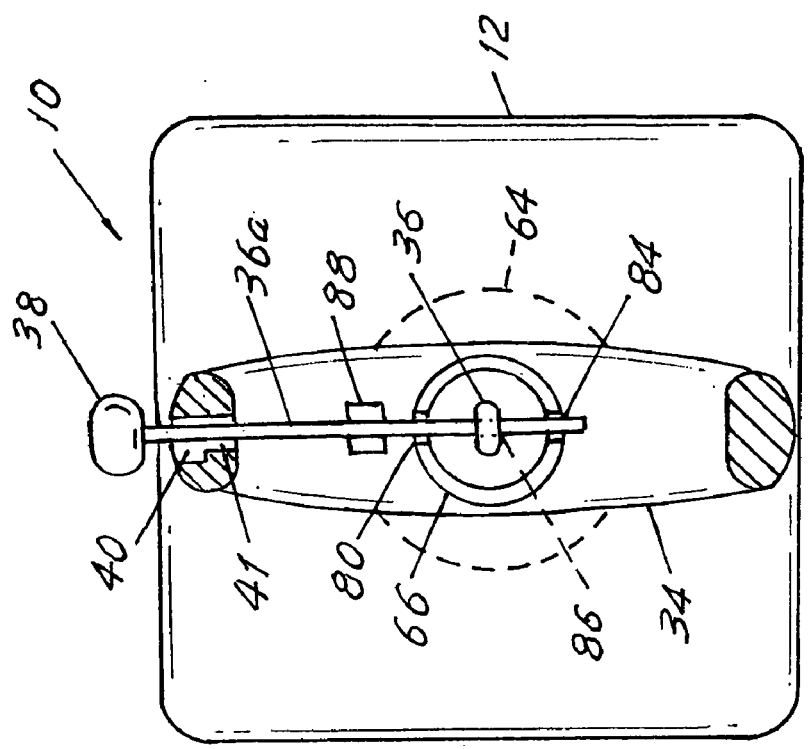
FIG. 8 is a perspective view of the top of the shaft of the preferred embodiment of the two-pet no-tangle retractable leash of the present invention.
Figure 7:
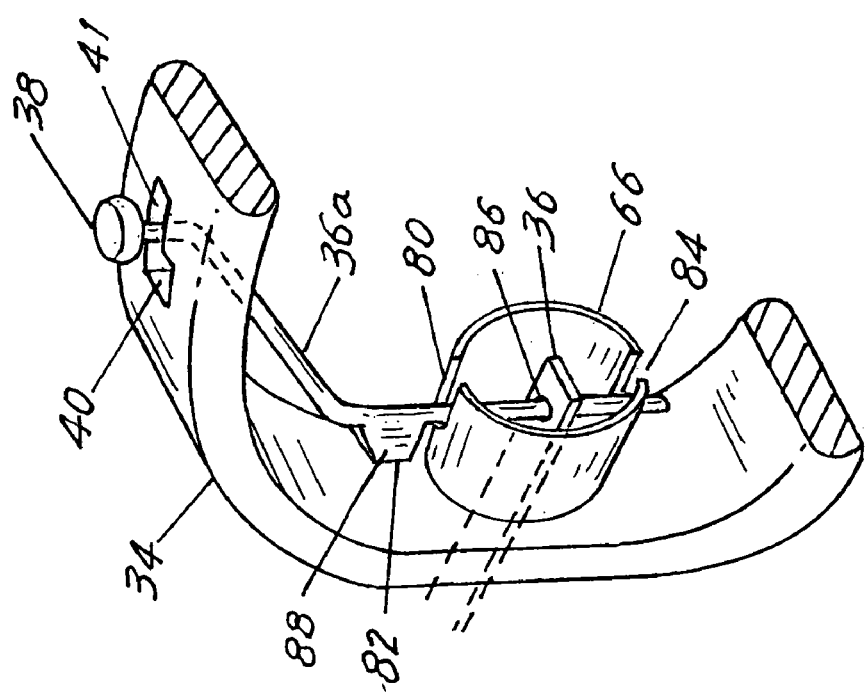
FIG. 7 is a close-up view of the connection of a brake rod extension to a brake rod and a shaft of the preferred embodiment of the two-pet no-tangle retractable leash of the present invention.

FIGS. 7 and 8 show the interconnection of the brake rod 36 and the brake rod extension 36a through the brake extension opening 86. One side of the, brake rod extension 36a rests in the brake notch 84 of the shaft 66 and the other side rests in the brake cutout 80 of the shaft 66. The brake rod extension 36a includes an elbow 88. Thus, when the brake rod extension 36a is pushed in the A direction the elbow 88 is pressed against the pivot point 82 on the handle 34, thereby lifting the brake rod 36 out of the shaft 66.

FIG. 8 further shows the notch 40 in the opening 41. After the brake rod extension 36a is pushed in the A direction, it may be secured in the notch 40 thereby keeping the pressure by the elbow 88 on the handle 34 at the pivot point 82. This maintains the lifted position of the brake rod 36 and, as described above, all movement of parts of the device 10 is stopped.

Although the present invention has been described in relation to particular embodiments thereof, many other variations and modifications and other uses will become apparent to those skilled in the art. Therefore, the present invention is not limited by the specific disclosure herein.

Reference number descriptions used in the specification are listed below:
- 10 A no-tangle two pet retractable leash
- 12 A housing
- 14 A first leash
- 16 A second leash
- 18 A first collar hook
- 20 A second collar hook
- 22 A first leash entry
- 24 A second leash entry
- 26 A first opening grommet
- 28 A second opening grommet
- 30 A front panel
- 32 A housing accessory
- 34 A handle
- 36 A brake rod
- 36a A brake rod extension
- 38 A push pad
- 40 A stop notch
- 41 An opening
- 42 first leash spool
- 43 A first spool floor
- 44 A second leash spool
- 45 A second spool floor
- 46 A first spool brake
- 48 A second spool brake
- 50 An axle
- 52 A brake rod opening
- 54 A first spool return spring
- 56 A second spool return spring
- 58 A cone brake
- 60 A brake pad
- 62 brake spring
- 64 A bearing
- 66 A shaft
- 68 A first return spring end
- 70 A second return spring end
- 72 A second leash end
- 74 A first leash end
- 76 A battery case
- 78 A back panel
- 80 A shaft cutout
- 82 A pivot point
- 84 A brake notch
- 86 A brake extension opening
- 88 An elbow

What is claimed is:

1. A one-hand operable two-pet no-tangle retractable leash apparatus comprising:
   an axle and a shaft, an axis of the axle being perpendicular to an axis of the shaft, the axle having a rod opening;
   first and second spools mounted on the axle, each spool having a spool brake element and a return spring for retracting a leash; and
   a brake attached to a brake rod in a position engagable with said spool brake elements, the brake rod passing through the rod opening and through the shaft.

2. The apparatus of claim 1, wherein a rotation of the shaft around the shaft axis is enabled when the brake is not engaged with the spool brakes and disabled when the brake is engaged.

3. The apparatus of claim 1, wherein a rotation of the spools around the axle axis is enabled when the brake is not engaged with the spool brakes and disabled when the brake is engaged.

4. The apparatus of claim 1, further comprising a housing including a front panel having a first leash opening and a second leash opening for spooling and retracting the leash.

5. The apparatus of claim 4, wherein each leash opening includes a grommet for supporting the leash.

6. The apparatus of claim 4, further comprising a bearing for rotatably supporting the shaft, the bearing is affixed to the housing opposite the front panel.

7. The apparatus of claim 4, wherein the front panel includes an accessory selected from one of a flash light, a radio, a clock, a global positioning device, a beacon signal, and a siren sounding device.

8. The apparatus of claim 4, wherein the first spool includes a retractable leash being spooled through the first opening and the second spool includes a retractable leash being spooled through the second opening.

9. The apparatus of claim 8, wherein each leash has a proximal end attached to the spool and a distal end extending through the first and second leash opening in a front panel.

10. The apparatus of claim 9, wherein the spools and the spool brake elements are rotatably mounted on the axle, the return springs being in a first position where the leash is fully wound on each of the spools.

11. The apparatus of claim 10, wherein proximal ends of the return springs are fixably connected to the spools and distal ends of the return springs fixably connected to the axle,
   the return spring is torqued from its first position when a force is exerted to pull the leash out of the housing thereby rotating the spools,
   the return spring returns to its first position when the force is terminated, thus rewinding the leash.

12. The apparatus of claim 1, wherein a brake spring is positioned around the brake rod between the disk cone brake and the axle.

13. The apparatus of claim 1, further comprising a handle attached to the shaft and including a stop notch.

14. The apparatus of claim 1, wherein the first and the second spools operate independent of each other.

15. A two-pet no-tangle retractable leash device comprising:
   an axle having a rod opening perpendicular to its axis;
   a first spool including a first leash and a second spool including a second leash rotatably mounted on the axle,
   each leash having a proximal end attached to the spool and a distal end extending through one of two leash openings,
   each spool having a spool brake element and a return spring, a proximal end of the return spring being connected to the spool and a distal end of the return spring being connected to the axle, when a force is applied to pull the leashes the spools rotate thereby unwinding the return springs, when the force is removed, the return springs rewind forcing the spool to rewind the leash to its original position;
   a shaft having a proximal and a distal end, the shaft being positioned perpendicular to the axle;

a brake rod having a distal end passing through the rod opening and the proximal end passing through the shaft;

a brake connected to the distal end of the brake rod; and a brake spring positioned on the brake rod between the brake and the axle, wherein the shaft rotation around the shaft axis and the spools' rotation around the axle axis is enabled when the brake is not engaged and disabled when the brake is engaged.

16. The device of claim 1, further comprising:

a housing for supporting the axle and the shaft;

a front panel including an accessory and a first and second leash opening, each leash opening having a grommet;

a handle attached to the proximal end of the shaft, the handle including a stop notch for operating the brake rod; and a bearing attached to the housing for rotatably supporting the shaft.

* * * * *